Sept. 17, 1963  A. H. DILLEMUTH  3,103,749
LEVEL
Filed Oct. 23, 1961  2 Sheets-Sheet 1
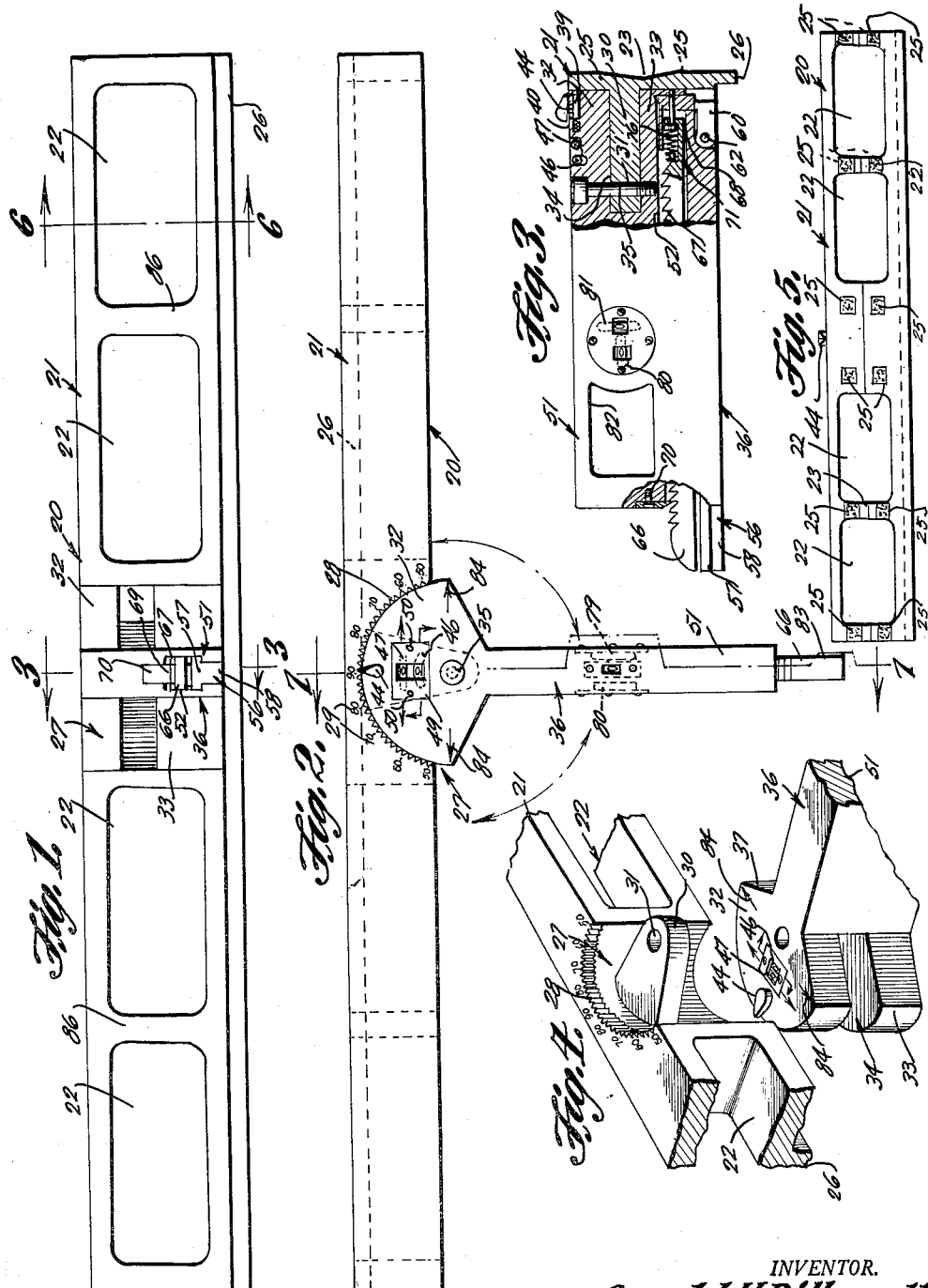
INVENTOR.
Arnold H. Dillemuth,
BY
Victor J. Evans & Co.
Attorneys

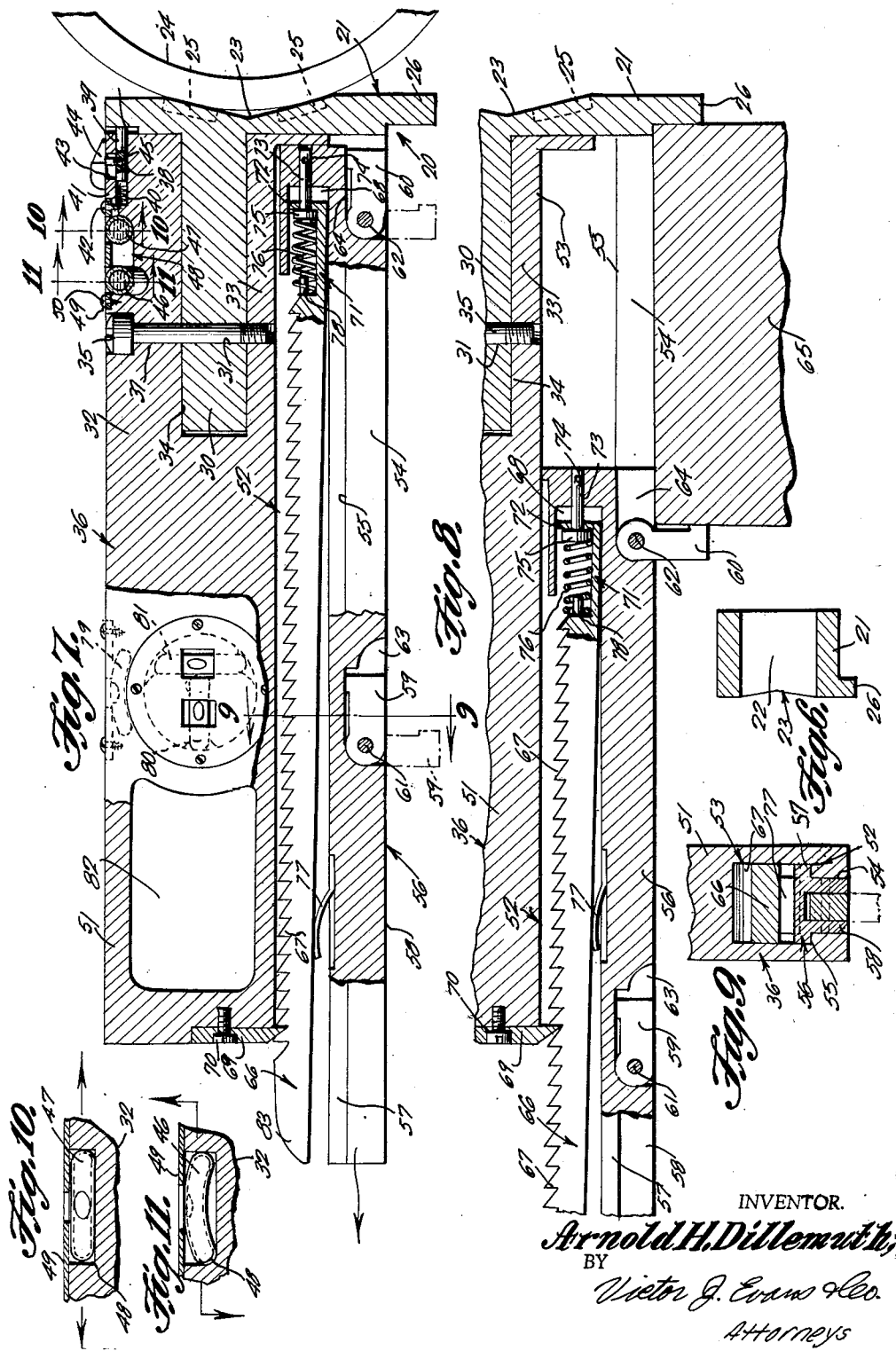

United States Patent Office 3,103,749
Patented Sept. 17, 1963

3,103,749
LEVEL
Arnold H. Dillemuth, 405 Liverpool Drive,
Cardiff, Calif.
Filed Oct. 23, 1961, Ser. No. 147,028
1 Claim. (Cl. 33—207)

The present invention relates to a leveling device, and more particularly to a leveling device which can be clamped to an object or supporting member so as to permit various types of objects or members to be conveniently and accurately leveled or plumbed.

The primary object of this invention is to provide a leveling device which is constructed so that the device will remain on the object to be leveled while the object is being secured, and wherein various angles can be readily set by rotating a swivelly mounted level head to the desired angle.

A further object is to provide a level which includes a novel means for permitting the level to be clamped in place securely on different objects or members, and wherein the level includes a magnetic holding means for facilitating the use of the level on or in conjunction with various articles that are subject to or capable of responding to magnetic attraction.

Another object is to provide a level of the type described that amy be utilized speedily and with precision by even inexperienced operators.

Further objects and advantages of the present invention are to provide improved elements and arrangements thereof in a device of the character described that is economical to produce, durable in form, and conductive to the most economical use of materials and uniformity of members formed therefrom.

Still further objects and advantages will become apparent in the subsequent description in the specification.

In the drawings:

FIGURE 1 is a side elevational view of the level of the present invention, with parts broken away and in section.

FIGURE 2 is a top plan view of the level showing the head piece in a location or position which is at right angles with respect to the bar.

FIGURE 3 is a sectional view taken on the line 3—3 of FIGURE 1.

FIGURE 4 is an enlarged fragmentary perspective view showing the connection between the head piece and bar.

FIGURE 5 is a view looking at the opposite side from that shown in FIGURE 1, and being on a reduced scale.

FIGURE 6 is a sectional view taken on the line 6—6 of FIGURE 1.

FIGURE 7 is a sectional view taken on the line 7—7 of FIGURE 2.

FIGURE 8 is an enlarged sectional view showing the level clamped on a post or the like.

FIGURE 9 is a sectional view taken on the line 9—9 of FIGURE 7.

FIGURE 10 is a sectional view taken on the line 10—10 of FIGURE 7.

FIGURE 11 is a sectional view taken on the line 11—11 of FIGURE 7.

Referring in detail to the drawings, the numeral 20 indicates the leveling device or level of the present invention which is shown to comprise a bar that is indicated generally by the numeral 21, and the bar 21 is provided with a plurality of openings or cutouts 22 therein so as to insure that the bar 21 is of the lowest possible weight consistent with the necessary rigidity or strength. As shown in FIGURE 3, the bar 21 is provided on one side or surface thereof with a generally arcuate recessed surface 23 which helps insure that the bar 21 can snugly engage or sit against a member such as a rounded article or member 24, FIGURE 7.

As shown in FIGURE 5, a plurality of magnets 25 are arranged in spaced apart relation with respect to each other, and these magnets 25 are suitably affixedly mounted in the bar 21 so as to provide a means of permitting the bar to be held by magnetic attraction against certain articles or members, as for example against members which are made of metal.

Extending longitudinally along one edge of the bar 21 is a lip 26, FIGURE 1, for a purpose to be later described.

As shown in FIGURE 4 for example, the bar 21 is provided with a recess 27 intermediate the ends thereof, and the recess 27 is of generally arcuate formation, and there is provided on the bar 21 adjacent the recess 27 a plurality of teeth 28. The numeral 29 indicates indicia or scale markings on the bar 21 adjacent the teeth 28. As shown in the drawings there is provided a lug or base piece 30 which is secured to or formed integral with the bar 21, and the lug 30 is provided with an aperture or opening 31 therein. The numeral 36 indicates a head piece which includes first and second spaced apart flanges 32 and 33 which define or provide a space 34 therebetween for receiving the lug 30, and the numeral 35 indicates a pivot pin which is adapted to extend through apertures or openings such as the openings 37 in the flanges 32 and 33 and through the opening 31 in the lug 30, whereby the head piece 36 is pivotally connected to the bar 21.

The first flange 32 is provided with a recess 38, FIGURE 7, and movably mounted in the recess 38 is a pawl or dog 39 which is adapted to engage or coact with the teeth 28 on the bar 21. The pawl 39 is normally urged into engagement with the teeth 28 by means of a spring member 40. The numeral 41 indicates a plate which is arranged contiguous to the pawl 39, and the plate 41 is secured in place to the bar as for example by means of screws 42. As shown in the drawings the plate 41 is provided with a slot 43, and the numeral 44 indicates a movable thumb piece or button which is connected to the pawl 39 by means of a securing element 45, and the securing element 45 is adapted to move through a clearance slot 43 in the plate 41.

As shown in the drawings spirit levels 46 and 47 are arranged in spaced apart relation with respect to each other, and these spirit levels 46 and 47 are adapted to be retained in a recessed area 48 in the flange 32, as for example by means of a retaining plate 49 which is held in place by screws 50.

The head piece 36 further includes an elongated support portion 51 which is provided with a longitudinally extending groove or recess 52 therein, FIGURE 9, and as shown in the drawings the groove 52 is shaped to include an enlarged portion 53 as well as a portion 54 of reduced size whereby there is defined at the junction of the portions 53 and 54 shoulders 55.

The numeral 56 indicates a slide which is adjustably or slidably arranged in the groove 52, and the slide 56 has a configuration that generally conforms to the configuration of the groove 52, so that the slide 56 includes an enlarged section 57 which is arranged in the enlarged portion 53 of the groove 52, and the slide 56 further includes a section 58 of reduced size that is arranged in the portion 54 of the groove 52.

The numerals 59 and 60 indicate fingers that are pivotally connected to the slide 56 by means of pivot pins 61 and 62 respectively, and these fingers 59 and 60 are adapted to selectively engage or be received in recesses 63 and 64 in the slide 56. The numeral 65 indicates a member such as a post which is shown being clamped between a finger 60 and the lip 26, FIGURE 8.

As shown in the drawings, there is provided an insert 66 which is interposed between the main body portion of the slide 56 and the support portion 51 of the head piece 36, and the insert 66 is provided with a plurality of longitudinally extending teeth 67 thereon, and the numeral 69 indicates a plate which is adapted to be secured to the support portion 51 as at 70, and the plate 69 is adapted to coact with the teeth 67 as later described in this application. The numeral 71 indicates a bracket portion that is secured to or formed integral with the inner end of the insert 66, and the bracket portion 71 is adapted to be received in a recessed section 68 on the slide 56, FIGURE 8. The bracket portion 71 includes a wall portion 72, and the numeral 73 indicates a pin which is secured to the slide 56 as at 74, and the pin 73 includes an enlarged head 75, and as shown in the drawings the pin 73 is adapted to extend through a suitable opening in the wall portion 72 of the bracket 71. The numeral 76 indicates a coil spring which is interposed between the head 75 and the wall surface 78 of the insert 66 whereby the spring 76 will exert pressure on the insert 66 in the proper direction. The numeral 77 indicates a spring member that is interposed between the insert 66 and the adjacent portion of the slide 56 for normally urging the insert 66 upwardly, FIGURES 7 and 8.

As shown in FIGURE 7 for example, spirit levels 79, 80 and 81 are suitably mounted in and retained in the support portion 51. The support portion 51 is adapted to be recessed or cutaway as at 82 so as to help reduce or minimize the weight thereof.

From the foregoing, it is apparent that there has been provided a level which is adapted to be used in a plurality of highly convenient manners or ways, and in use with the parts arranged as shown in the drawings, it will be seen that the level 20 includes the bar 21 which has the longitudinally extending lip 26 secured thereto or formed integral therewith, and the intermediate portion of the bar 21 is recessed as at 27, and there is provided teeth 28 adjacent the recess 27, and the lug 30 is secured to or formed integral with the bar 21. The numeral 36 indicates the head piece which is swivelly or pivotally connected to the bar as for example by means of the hinge or pivot pin 35 which extends through the registering apertures 37 and 31. The pawl 39 is urged into engagement with the teeth 28 by means of the spring 40 so that the pawl 39 will coact with the teeth 28 to maintain the head piece 36 immobile in its various adjusted positions. When it is desired to pivot or adjust the head piece 36, the button 44 can be manually moved to compress the spring 40, and since the button 44 is connected to the pawl 39 by means of the securing elements 45 which extend through the slots 43 and the plate 41, it will be seen that by manually pushing or moving the button 44 from right to left in FIGURE 7 for example, the spring 40 will be compressed to retract or withdraw the pawl 39 from the teeth 28 whereby the head piece 36 can pivot to the desired location relative to the bar 21.

It is to be noted that the bar 21 includes on one surface thereof the arcuate face or recessed portion 23 which provides a surface that is adapted to snugly engage a rounded member such as the member 24 so that the level 20 can fit snugly against such a member as the member 24. The magnets 25 are suitably embedded in or secured in the bar 21, whereby when the level is used against a metal object or the like, the magnets 25 can exert a holding action due to the magnetic attraction to thereby maintain the level stationary in the desired position.

The bar 21 is cutaway as at 22 so as to lighten the weight thereof, and the support portion 51 is cut away as at 82 so as to further reduce the weight of the entire tool or gauge of the present invention.

As shown in FIGURE 8, one of the fingers such as the fingers 60 can be moved downwardly from its recess 64 due to the provision of the pivot pin 62, whereby the finger 60 can coact with the lip 26 for clampingly engaging a member such as the post 65 therebetween whereby the level can be conveniently supported on such a member 65 to facilitate the use thereof. When the level is being used on larger members or posts, the finger 59 can be pivoted downwardly on the pin 61, and when the finger 59 is being used, the finger 60 is adapted to be arranged within its recess 64, whereby the finger 59 and lip 26 can coact to clampingly engage therebetween a post such as the post on which the level is being clamped or being used.

The slide 56 is adjustably mounted in the groove 52 of the support portion 51, and in the drawings, the slide 56 is adapted to have a configuration which generally conforms to the configuration of the groove 52, so that it will be seen that the slide 56 includes a section 57 and 58 which are adapted to be snugly received in the portions 53 and 54 of the groove 52. The shoulders 55 prevent the slide 56 from falling down through the groove 52. The insert 66 is provided with the teeth 67 thereon and these teeth 67 are adapted to coact with and engage the beveled edge of the plate 69 in order to provide a retaining or holding latching means for the slide whereby the slide can be maintained stationary in the desired or adjusted positions. The spring member 77 serves to exert the necessary pressure on the insert 66 whereby the teeth 67 will be maintained in engagement with the plate 69, and when it is desired to adjust or move the slide 56 to a different position, it is only necessary to manually press on a portion such as the portion 83 of the insert 66 whereby the spring member 77 can be compressed in order to permit the teeth 67 to move out of engagement with the plate 69 whereby the slide 56 and insert 66 can then be moved in or out of the groove 52 to the desired location. After these parts have been moved to the desired location, manual pressure on the portion 83 can be released whereby the spring member 77 will move the insert 66 away from the slide 56, as for example as shown in FIGURE 7 so that the teeth 67 will engage the beveled edge of the plate 69 in order to prevent the slide from accidentally moving out of its desired position. The springs 76 serve to exert pressure outwardly on the insert 66 so that the necessary holding action between the teeth 67 and plate 69 can take place.

It is to be noted that there is provided the plurality of spirit levels such as the spirit levels 46 and 47, as well as the spirit levels 79, 80 and 81, whereby these spirit levels can be used in making the various readings as desired or required.

The parts can be made of any suitable materials and in different shapes or sizes.

The head piece 36 may be arranged so that it is parallel with the bar 21 whereby the level 20 can be used as a two directional level. Or, as shown in FIGURE 8 the level can be clamped on a post such as the post 65 as for example by means of the finger 60 and lip 26, and thus FIGURE 8 illustrates a convenient manner of using the level in such constructions where this arrangement is desirable or requirable. The head piece 36 may be arranged so that it is positioned at a ninety degree angle with respect to the bar 21, and the level can be used to show or indicate vertical trueness of a post by reading the two directional level on the side of the level head, and the spirit levels 79, 80 and 81 are adapted to be used for these various readings. A cats-eye spirit level can be used as part of the present invention.

The thumb button 44 is adapted to be used for actuating or moving the pawl or pin locator 39.

As shown in the drawings, two arrows are arranged at ninety degrees with respect to the thumb button 44, and these two arrows are indicated by the numeral 84, FIGURES 2 and 4, and these two arrows 84 are adapted to be used when the level head 36 is turned parallel to the bar so as to permit the user to obtain any grade angle desired. The groove or recessed portion 23 has a generally V-shape or arcuate formation, and there is provided the magnets 25 contiguous to the surface 23 so as to permit the user to plumb or level steel, wooden posts or the like. Ribs such as the ribs 86 are provided in the bar 21 to help strengthen the bar.

It will be seen that the level of the present invention includes the main bar 21 as well as the level head 36 that is swivelly connected to the main bar as for example by means of the pin 35 and its associated parts. The slide 56 is adjustably connected to the support portion 51 of the head piece 36, and there is also provided the spring 76 for helping exert the holding action on the insert 66. The level of the present invention further includes the spring loaded pin or pawl 39. The pin 35 is adapted to have a generally flat head, as for example as shown in FIGURE 7. The fingers 59 and 60 function as clamping fingers for coaction with the lip 26. The spirit levels are adapted to be suitably calibrated. The bar and head piece can be made of a suitable material such as cast aluminum.

With the present invention, various types of work or jobs can be facilitated, as for example the level 20 of the present invention is adapted to be used by fence builders, carpenters or the like since the level can be clamped to a post, stud, rafter, or any other object to be leveled or plumbed. An important advantage or feature of the present invention is that the level remains on the object to be leveled while the object is being secured. In addition, angles can be readily set by rotating the swivel level head 36 to the desired angle. As shown in FIGURE 8, a post such as the post 65 can be conveniently plumbed. Magnesium can also be used for making certain of the parts as desired or required. A cat's-eye level can be provided as optional equipment.

It is to be noted that the slide 56 is normally urged in a direction so that a finger 59 or 60 can coact with the lip 26 to exert a clamping action on a member such as the member 65, and the coil spring 76 serves to force the slide 56 in the proper direction, that is the spring 76 has a tendency to urge or bias the slide 56 from left to right in FIGURES 7 and 8. That is the spring 76 bears against the head 72 of the pin 73, and since the pin 73 is connected as at 74 to the slide 56, and with the piece 67 engaging the plate 69, it will be seen that the slide 56 will be urged or biased in the proper direction. This provides the necessary clamping pressure for holding the level securely in place.

The flat spring members 77 have a tendency to force or urge the slide insert 66 upwardly so that the saw teeth 67 on the insert 66 can locate on the knife edge of the plate 69 which is affixed to the level head assembly as at 70, FIGURE 7. The clamping pressure is variable by the amount of saw teeth 67 advance after the point of contact of the fingers 59 or 60 on the object to be leveled.

The slide assembly is a separate unit and can be removed from the level head assembly very readily by forcing down on the insert 66 and pulling the slide assembly out of the head piece. The fingers 59 and 60 can be retracted or moved to the position shown in solid lines from the position shown in dotted lines, FIGURE 7, and the fingers 59 and 60 can be retracted into the recesses 63 and 64 when these fingers are not being used.

While certain embodiments of the invention have been illustrated and described in detail, it will be understood that the invention may be otherwise embodied and the dimensions and interrelation of parts changed so long as the objects of the invention are attained.

What is claimed is:

A level comprising a bar having an inwardly recessed surface on one side thereof, a plurality of spaced apart magnets fixedly mounted in said bar adjacent said recessed surface, a longitudinally extending lip extending from an edge of said bar, there being an arcuate recessed section in said bar intermediate the ends thereof, an apertured lug affixed to said bar and arranged contiguous to said recessed section, a head piece including first and second spaced apart flanges arranged on opposite sides of said lug, a pivot pin connecting said flanges and lug together, a spring pressed pawl movably mounted in said first flange, teeth on said bar for coaction with said pawl, spirit levels mounted in said first flange, said head piece further including an elongated support portion, there being an elongated groove in said support portion, said groove including an enlarged portion and a portion of reduced size whereby there is defined shoulders at the junction of the first and second portions of the groove, a slide adjustably mounted in said groove and said slide including an enlarged section arranged in the enlarged portion of said groove, and said slide further including a section of reduced size that is arranged in the portion of the groove of reduced size, a pair of spaced apart fingers pivotally connected to said slide, there being recesses in said slide for at times receiving said fingers, an insert interposed between said slide and the adjacent surface of the support portion, said insert having a plurality of teeth thereon, a plate affixed to an end of said support for coaction with said last named teeth, a spring member interposed between said insert and slide, a bracket affixed to an end of said insert, a pin connected to said slide and said pin extending through the adjacent portion of said bracket, and said pin having an enlarged head on one end thereof, a coil spring interposed between said enlarged head and a portion of said insert, and a plurality of spaced apart spirit levels mounted in said head piece.

References Cited in the file of this patent

UNITED STATES PATENTS

| | | |
|---|---|---|
| 1,230,901 | Houghton | June 26, 1917 |
| 1,419,354 | Boon | June 13, 1922 |
| 2,002,676 | Owens | May 28, 1935 |

FOREIGN PATENTS

| | | |
|---|---|---|
| 1,052,509 | France | Jan. 25, 1954 |